United States Patent
Yamashita

(10) Patent No.: US 10,062,512 B2
(45) Date of Patent: Aug. 28, 2018

(54) MULTILAYER CERAMIC ELECTRONIC COMPONENT

(71) Applicant: Murata Manufacturing Co., Ltd., Nagaokakyo-shi, Kyoto-fu (JP)

(72) Inventor: Yasuharu Yamashita, Nagaokakyo (JP)

(73) Assignee: Murata Manufacturing Co., Ltd., Kyoto (JO)

( * ) Notice: Subject to any disclaimer, the term of this patent is extended or adjusted under 35 U.S.C. 154(b) by 0 days.

(21) Appl. No.: 15/488,562

(22) Filed: Apr. 17, 2017

(65) Prior Publication Data

US 2017/0309402 A1 Oct. 26, 2017

(30) Foreign Application Priority Data

Apr. 22, 2016 (JP) .................................. 2016-086147

(51) Int. Cl.

| | |
|---|---|
| *H01G 4/232* | (2006.01) |
| *H01G 4/30* | (2006.01) |
| *H01F 27/28* | (2006.01) |
| *H01C 7/00* | (2006.01) |
| *H01F 27/29* | (2006.01) |
| *H01G 4/12* | (2006.01) |
| *H01F 17/00* | (2006.01) |

(52) U.S. Cl.
CPC .......... *H01G 4/2325* (2013.01); *H01C 7/008* (2013.01); *H01F 17/0013* (2013.01); *H01F 27/2804* (2013.01); *H01F 27/292* (2013.01); *H01G 4/1218* (2013.01); *H01G 4/30* (2013.01); *H01F 2027/2809* (2013.01)

(58) Field of Classification Search
CPC ...... H01G 4/2325; H01G 4/1218; H01G 4/30; H01F 17/0013; H01F 27/292
See application file for complete search history.

(56) References Cited

U.S. PATENT DOCUMENTS

| | | | |
|---|---|---|---|
| 2011/0122540 A1* | 5/2011 | Ogawa ................. | H01G 4/2325 361/305 |
| 2014/0151101 A1* | 6/2014 | Lee .......................... | H01G 4/12 174/260 |
| 2014/0182907 A1* | 7/2014 | Lee ........................ | H05K 1/162 174/258 |
| 2015/0021079 A1* | 1/2015 | Lee ........................ | H05K 1/185 174/260 |

FOREIGN PATENT DOCUMENTS

JP 2014-086606 A 5/2014

* cited by examiner

*Primary Examiner* — David M Sinclair

(74) *Attorney, Agent, or Firm* — Keating & Bennett, LLP

(57) ABSTRACT

A multilayer ceramic electronic component has a dimension in a longitudinal direction of no less than about 0.12 mm and no more than about 0.27 mm, a dimension in a width direction of no less than about 0.06 mm and no more than about 0.14 mm, and a dimension in a lamination direction of no less than about 0.06 mm and no more than about 0.14 mm, for example. Each of a first outer electrode and a second outer electrode includes an underlying electrode layer disposed on a surface of a multilayer body, a nickel-plated layer covering the underlying electrode layer, and a tin-plated layer covering the nickel-plated layer. The nickel-plated layer in each of the first outer electrode and second outer electrode has surface roughness of no less than about 3 μm and no more than about 6 μm, for example.

20 Claims, 6 Drawing Sheets

MULTILAYER CERAMIC ELECTRONIC COMPONENT

CROSS REFERENCE TO RELATED APPLICATIONS

This application claims the benefit of priority to Japanese Patent Application No. 2016-086147 filed on Apr. 22, 2016. The entire contents of this application are hereby incorporated herein by reference.

BACKGROUND OF THE INVENTION

1. Field of the Invention

The present invention relates to multilayer ceramic electronic components and in particular to a miniature multilayer ceramic electronic component.

2. Description of the Related Art

One example structure of mounting a multilayer ceramic capacitor is disclosed in Japanese Unexamined Patent Application Publication No. 2014-86606. In the structure of mounting the multilayer ceramic capacitor described in Japanese Unexamined Patent Application Publication No. 2014-86606, a pair of outer electrodes in the multilayer ceramic capacitor are connected to a pair of pads on a substrate by soldering. The width of each of the pair of pads is slightly larger than the width of each of the pair of outer electrodes. This aims to achieve the self-alignment effect in mounting the multilayer ceramic capacitor on the substrate.

In mounting a multilayer ceramic electronic component, such as a multilayer ceramic capacitor, on a substrate, the multilayer ceramic electronic component is arranged on the substrate by a mounter. The size of multilayer ceramic electronic components is able to be reduced. The miniaturized multilayer ceramic electronic components have become densely mounted on the substrate. Thus, high accuracy of arranging each of the multilayer ceramic electronic components is needed in mounting the multilayer ceramic electronic components. Because the accuracy of arrangement by the mounter is limited, it is desired that the self-alignment effect be effectively used in mounting the multilayer ceramic electronic component.

SUMMARY OF THE INVENTION

Accordingly, preferred embodiments of the present invention provide a multilayer ceramic electronic component capable of achieving improved arrangement accuracy in mounting the multilayer ceramic electronic component by utilizing a self-alignment effect.

According to a preferred embodiment of the present invention, a multilayer ceramic electronic component includes a multilayer body, a first outer electrode, and a second outer electrode. The multilayer body includes a plurality of dielectric layers and a plurality of inner electrode layers being laminated and includes a first principal surface and a second principal surface opposed to each other in a lamination direction, a first side surface and a second side surface opposed to each other in a width direction perpendicular or substantially perpendicular to the lamination direction, and a first end surface and a second end surface opposed to each other in a longitudinal direction perpendicular or substantially perpendicular to both the lamination direction and the width direction. The first outer electrode is disposed on the first end surface and disposed on a portion of each of the first principal surface, the second principal surface, the first side surface, and the second side surface such that portions are connected to each other. The second outer electrode is disposed on the second end surface and disposed on a portion of each of the first principal surface, the second principal surface, the first side surface, and the second side surface such that portions are connected to each other. The multilayer ceramic electronic component preferably has a dimension in the longitudinal direction of no less than about 0.12 mm and no more than about 0.27 mm, a dimension in the width direction of no less than about 0.06 mm and no more than about 0.14 mm, and a dimension in the lamination direction of no less than about 0.06 mm and no more than about 0.14 mm, for example. Each of the first outer electrode and the second outer electrode includes an underlying electrode layer disposed on the surface of the multilayer body, a nickel-plated layer covering the underlying electrode layer, and a tin-plated layer covering the nickel-plated layer. The nickel-plated layer in each of the first outer electrode and the second outer electrode preferably has surface roughness of no less than about 3 µm and no more than about 6 µm, for example.

According to a preferred embodiment of the present invention, the underlying electrode layer may have a maximum thickness of no less than about 5 µm and no more than about 20 µm, for example.

According to a preferred embodiment of the present invention, the nickel-plated layer may have a thickness of no less than about 1 µm and no more than about 6 µm, for example.

In preferred embodiments of the present invention, the arrangement accuracy in mounting the multilayer ceramic electronic component is improved by effective use of the self-alignment effect.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
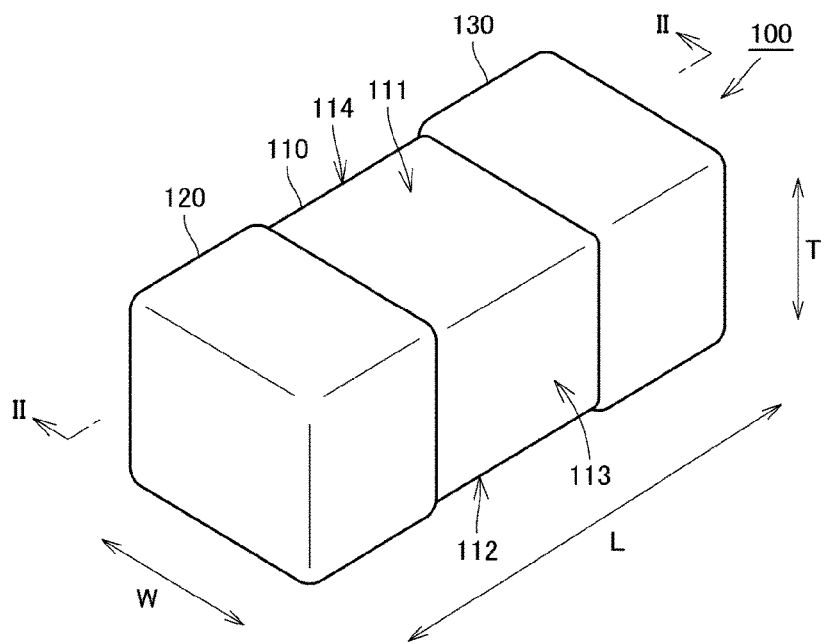
FIG. 1 is a perspective view that illustrates an external appearance of a multilayer ceramic electronic component according to a preferred embodiment of the present invention.

Multilayer ceramic electronic components according to preferred embodiments of the present invention are described below with reference to the drawings. In the description of preferred embodiments below, the same reference numerals are used in the same or corresponding portions in the drawings, and the description thereof is not repeated. In a present preferred embodiment, a multilayer ceramic capacitor is described as an example of the multilayer ceramic electronic component. The multilayer ceramic electronic component is not limited to the multilayer ceramic capacitor and may be a multilayer ceramic inductor, multilayer ceramic thermistor, or the like.

Figure 2:
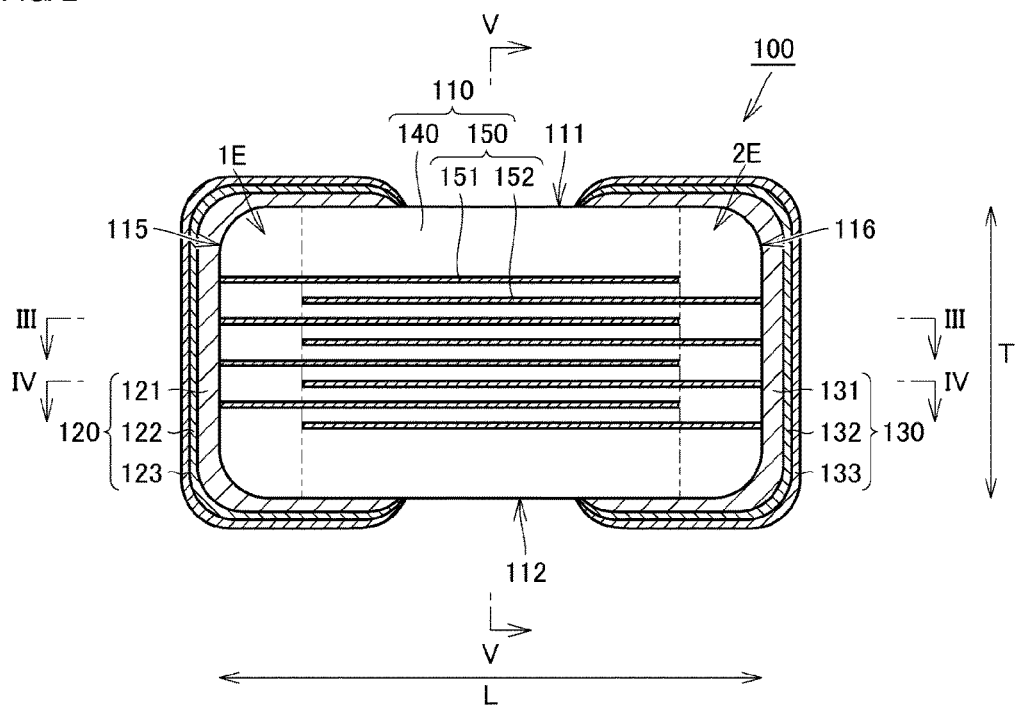
FIG. 2 is a cross-sectional view of the multilayer ceramic electronic component illustrated in FIG. 1 as seen from the direction of the arrows of the line II-II.
Figure 3:
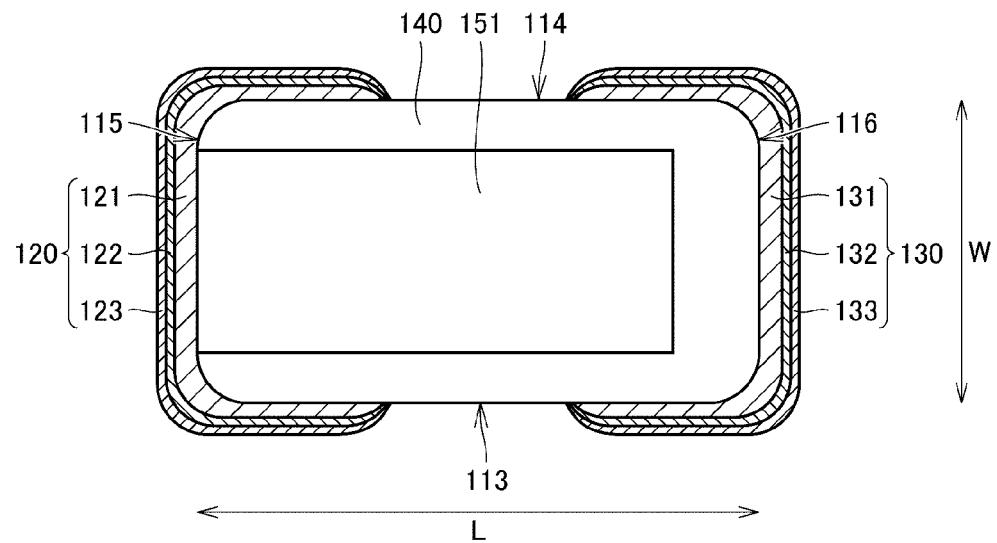
FIG. 3 is a cross-sectional view of the multilayer ceramic electronic component illustrated in FIG. 2 as seen from the direction of the arrows of the line III-III.
Figure 4:
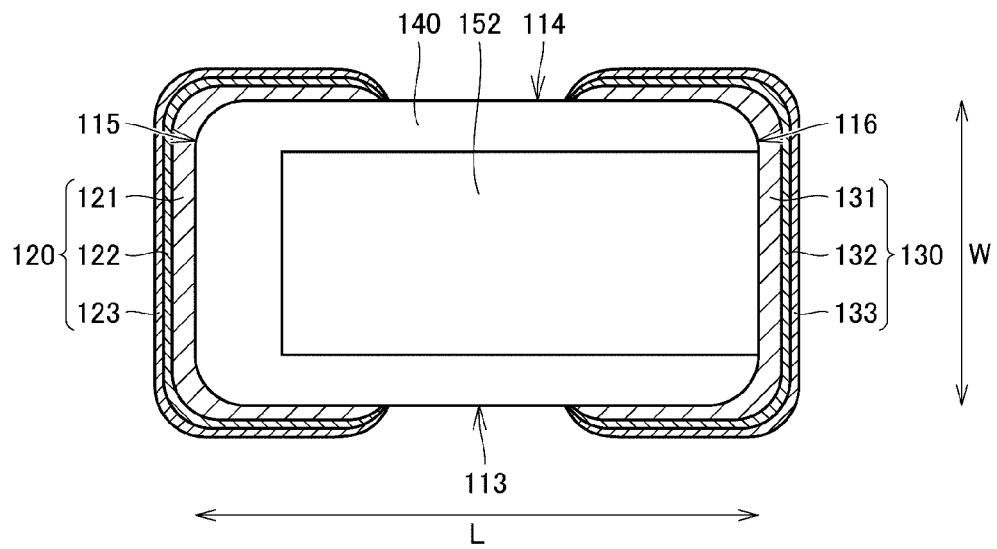
FIG. 4 is a cross-sectional view of the multilayer ceramic electronic component illustrated in FIG. 2 as seen from the direction of the arrows of the line IV-IV.
Figure 5:
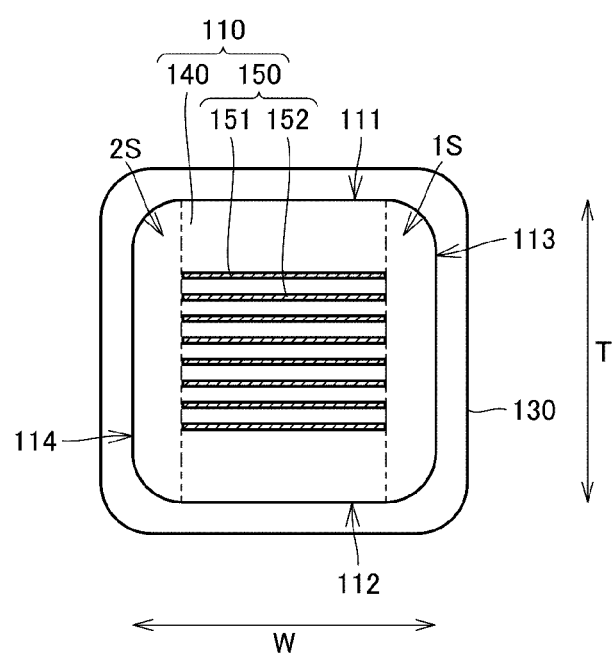
FIG. 5 is a cross-sectional view of the multilayer ceramic electronic component illustrated in FIG. 2 as seen from the direction of the arrows of the line V-V.

FIG. 1 is a perspective view that illustrates an external appearance of the multilayer ceramic electronic component according to the present preferred embodiment of the present invention. FIG. 2 is a cross-sectional view of the multilayer ceramic electronic component illustrated in FIG. 1 as seen from the direction of the arrows of the line II-II. FIG. 3 is a cross-sectional view of the multilayer ceramic electronic component illustrated in FIG. 2 as seen from the direction of the arrows of the line III-III. FIG. 4 is a cross-sectional view of the multilayer ceramic electronic component illustrated in FIG. 2 as seen from the direction of the arrows of the line IV-IV. FIG. 5 is a cross-sectional view of the multilayer ceramic electronic component illustrated in FIG. 2 as seen from the direction of the arrows of the line V-V. In FIGS. 1 to 5, the longitudinal direction of a multilayer body described below is indicated by L, the width direction of the multilayer body is indicated by W, and the lamination direction of the multilayer body is indicated by T.

As illustrated in FIGS. 1 to 5, a multilayer ceramic electronic component 100 according to the present preferred embodiment of the present invention includes a multilayer body 110, a first outer electrode 120, and a second outer electrode 130. The multilayer body 110 preferably has a rectangular or substantially rectangular parallelepiped external shape. The multilayer body 110 includes a plurality of dielectric layers 140 and a plurality of inner electrode layers 150 being laminated. The multilayer body 110 includes a first principal surface 111 and second principal surface 112 opposed to each other in the lamination direction T, a first side surface 113 and second side surface 114 opposed to each other in the width direction W, which is perpendicular or substantially perpendicular to the lamination direction T, and a first end surface 115 and second end surface 116 opposed to each other in the longitudinal direction L, which is perpendicular or substantially perpendicular to both the lamination direction T and width direction W.

The multilayer body 110, which preferably has a rectangular or substantially rectangular parallelepiped external shape, as described above, and may preferably include a rounded corner portion and rounded ridge portion. The corner portion is a portion where three surfaces of the multilayer body 110 meet, and the ridge portion is a portion where two surfaces of the multilayer body 110 meet. At least one of the first principal surface 111, second principal surface 112, first side surface 113, second side surface 114, first end surface 115, and second end surface 116 may include asperities.

The multilayer body 110 in the present preferred embodiment preferably has a dimension in the longitudinal direction L of not more than about 0.24 mm, a dimension in the width direction W of not more than about 0.15 mm, and a dimension in the lamination direction T of not more than about 0.15 mm, for example.

The multilayer ceramic electronic component 100 in the present preferred embodiment preferably has a dimension in the longitudinal direction L of no less than about 0.12 mm and no more than about 0.27 mm, a dimension in the width direction W of no less than about 0.06 mm and no more than about 0.14 mm, and a dimension in the lamination direction T of no less than about 0.06 mm and no more than about 0.14 mm, for example. The outer dimensions of the multilayer ceramic electronic component 100 can be measured by observation of the multilayer ceramic electronic component 100 with an optical microscope.

As illustrated in FIG. 2, the multilayer body 110 can be divided into a pair of outer layer portions and an inner layer portion in the lamination direction T. One of the pair of outer layer portions is a portion that includes the first principal surface 111 of the multilayer body 110 and that includes the first principal surface 111 and a dielectric layer 140 located between the first principal surface 111 and a first inner electrode layer 151 described below that is nearest the first principal surface 111. The other of the pair of outer layer portions is a portion that contains the second principal surface 112 of the multilayer body 110 and that includes the second principal surface 112 and a dielectric layer 140 located between the second principal surface 112 and a second inner electrode layer 152 described below that is nearest the second principal surface 112.

The inner layer portion is a region sandwiched between the pair of outer layer portions. That is, the inner layer portion includes a plurality of dielectric layers 140 that are not included in the outer layer portions and all of inner electrode layers 150.

The number of the plurality of dielectric layers 140 laminated may preferably be no less than about 20 and no more than about 100, for example. Each of the pair of outer layer portions may preferably have a thickness of no less than about 10 µm and no more than about 30 µm, for example. Each of the plurality of dielectric layers 140 included in the inner layer portion may preferably have a thickness of no less than about 0.5 µm and no more than about 3 µm, for example.

The dielectric layer 140 preferably is composed of a perovskite compound containing barium or titanium. The material of the dielectric layer 140 may be a dielectric ceramic material whose principal ingredient is barium titanate ($BaTiO_3$), calcium titanate ($CaTiO_3$), strontium titanate ($SrTiO_3$), or calcium zirconate ($CaZrO_3$). The dielectric ceramic material may contain, as an accessary ingredient, a manganese compound, magnesium compound, silicon compound, iron compound, chromium compound, cobalt compound, nickel compound, aluminum compound, vanadium compound, or rare-earth compound, in addition to the principal ingredient.

The plurality of inner electrode layers 150 include the plurality of first inner electrode layers 151 connected to the first outer electrode 120 and the plurality of second inner electrode layers 152 connected to the second outer electrode 130.

The number of the plurality of inner electrode layers 150 laminated may preferably be no less than 10 and no more than 60, for example. Each of the plurality of inner electrode layers 150 may preferably have a thickness of no less than about 0.3 µm and no more than about 1.0 µm, for example. The area coverage in which each of the plurality of inner electrode layers 150 covers the dielectric layer 140 without gaps may preferably be no less than about 50% and no more than about 95%, for example.

The material of the inner electrode layer 150 is a metal of one kind selected from the group consisting of nickel, copper, silver, palladium, and gold or an alloy containing it. One such example can be an alloy of silver and palladium. The inner electrode layer 150 may contain particles of a dielectric of the same composition as that of the dielectric ceramic material contained in the dielectric layer 140.

As illustrated in FIGS. 3 and 4, each of the first inner electrode layers 151 and second inner electrode layers 152 preferably has a rectangular or substantially rectangular shape as seen from the lamination direction T of the multilayer body 110. The first inner electrode layers 151 and second inner electrode layers 152 are alternately arranged at regular intervals in the lamination direction T of the multilayer body 110. The first inner electrode layer 151 and second inner electrode layer 152 are opposed to each other such that the dielectric layer 140 is disposed therebetween.

The first inner electrode layer 151 includes an opposed electrode portion opposed to the second inner electrode layer 152 and an extended electrode portion extended from the opposed electrode portion toward the first end surface 115 of the multilayer body 110. The second inner electrode layer 152 includes an opposed electrode portion opposed to the first inner electrode layer 151 and an extended electrode portion extended from the opposed electrode portion toward the second end surface 116 of the multilayer body 110. Because the dielectric layer 140 is positioned between the opposed electrode portion in the first inner electrode layer 151 and the opposed electrode portion in the second inner electrode layer 152, electrostatic capacitance is provided. This produces the function as a capacitor.

As illustrated in FIGS. 2 and 5, in the multilayer body 110, as seen from the lamination direction T of the multilayer body 110, a section between the opposed electrode portion and first side surface 113 is a first side margin 1S, a section between the opposed electrode portion and second side surface 114 is a second side margin 2S, a section between the opposed electrode portion and first end surface 115 is a first end margin 1E, and a position between the opposed electrode portion and second end surface 116 is a second end margin 2E.

Each of the first side margin 1S and second side margin 2S in the width direction W of the multilayer body 110 may preferably have a thickness of no less than about 5 µm and no more than about 30 µm, for example. Each of the first end margin 1E and second end margin 2E in the longitudinal direction L of the multilayer body 110 may preferably have a thickness of no less than about 20 µm and no more than about 80 µm, for example.

The first end margin 1E includes the extended electrode portions in the plurality of first inner electrode layers 151 and the plurality of dielectric layers 140 adjacent to these extended electrode portions. The second end margin 2E includes the extended electrode portions in the plurality of second inner electrode layers 152 and the plurality of dielectric layers 140 adjacent to these extended electrode portions.

The first outer electrode 120 is disposed on the first end surface 115 of the multilayer body 110 and disposed on a portion of each of the first principal surface 111, second principal surface 112, first side surface 113, and second side surface 114 such that portions are connected to each other.

The second outer electrode 130 is disposed on the second end surface 116 of the multilayer body 110 and disposed on a portion of each of the first principal surface 111, second principal surface 112, first side surface 113, and second side surface 114 such that portions are connected to each other.

The first outer electrode 120 includes a first underlying electrode layer 121 disposed on the surface of the multilayer body 110, a first nickel-plated layer 122 covering the first underlying electrode layer 121, and a first tin-plated layer 123 covering the first nickel-plated layer 122. The second outer electrode 130 includes a second underlying electrode layer 131 disposed on the surface of the multilayer body 110, a second nickel-plated layer 132 covering the second underlying electrode layer 131, and a second tin-plated layer 133 covering the second nickel-plated layer 132. Each of the first underlying electrode layer 121 and second underlying electrode layer 131 includes at least one of a baked layer, a resin layer, and a thin film layer.

The baked layer includes glass and metal. The metal material contained in the baked layer is a metal of one kind selected from the group of nickel, copper, silver, palladium, and gold or an alloy containing it. One such example may be an alloy of silver and palladium. The baked layer may be a lamination of a plurality of layers. The baked layer may be a layer formed by applying and baking conductive paste on the multilayer body 110 or a layer formed by co-firing with the inner electrode layer 150. The baked layer may preferably have a maximum thickness of no less than about 5 µm and no more than about 20 µm, for example.

The resin layer includes conductive particles and thermosetting resin. In the case where the resin layer is included, the baked layer may not be included and the resin layer may be disposed directly on the multilayer body 110. The resin layer may be a lamination of layers. The resin layer may preferably have a maximum thickness of no less than about 5 µm and no more than about 20 µm, for example.

The thin film layer is formed by a thin film forming method, such as sputtering or vapor deposition. The thin film layer is a layer in which metal particles are deposited and whose thickness is not more than about 1 µm, for example.

Each of the first nickel-plated layer 122 and second nickel-plated layer 132 has the function of preventing the underlying electrode layer from being eroded by solder in mounting the ceramic electronic component. Each of the first tin-plated layer 123 and second tin-plated layer 133 has the function of improving wettability of solder in mounting the multilayer ceramic electronic component 100 and of facilitating the mounting of the multilayer ceramic electronic component 100. Each of the first nickel-plated layer 122, second nickel-plated layer 132, first tin-plated layer 123, and second tin-plated layer 133 may preferably have a thickness of no less than about 1 µm and no more than about 6 µm, for example. Each of the first nickel-plated layer 122 and second nickel-plated layer 132 may preferably have surface roughness (Sa) of no less than about 3 µm and no more than about 6 µm, for example.

The thickness of each of the dielectric layers 140 and inner electrode layers 150 included in the inner layer portion is measured as described below. First, the multilayer ceramic electronic component 100 is polished, and a cross section perpendicular or substantially perpendicular to the longitudinal direction L is exposed. The exposed cross section is observed with a scanning electron microscope. Then, the thickness of each of the dielectric layers 140 and inner electrode layers 150 is measured on five evenly spaced lines in total. The five lines include a center line passing through the center of the exposed cross section and extending along the lamination direction T and four lines on both sides of the center line, and the four lines consist of two lines on one side and two lines on the other side. The mean value of the five measured values of the dielectric layers 140 is defined as the thickness of the dielectric layer 140. The mean value of the five measured values of the inner electrode layers 150 is defined as the thickness of the inner electrode layer 150.

In each of the upper portion, central portion, and lower portion in the exposed cross section in the lamination direction T, the thickness of each of the dielectric layers 140 and inner electrode layers 150 may be measured on the above-described five lines, the mean value of the measured values of the dielectric layers 140 may be defined as the thickness of the dielectric layer 140, and the mean value of the measured values of the inner electrode layers 150 may be defined as the thickness of the inner electrode layer 150.

The thickness of each of the outer layer portions, first end margin 1E, second end margin 2E, first underlying electrode layer 121, and second underlying electrode layer 131 is measured as described below. First, the multilayer ceramic electronic component 100 is polished, and a cross section perpendicular or substantially perpendicular to the width direction W is exposed. The exposed cross section is observed with a microscope, and the thickness is measured. The measurement position for each of the outer layer portions is in a central portion in the longitudinal direction L, and the measurement position for each of the first end margin 1E, second end margin 2E, first underlying electrode layer 121, and second underlying electrode layer 131 is in a central portion in the lamination direction T.

The thickness of each of the first side margin 1S and second side margin 2S is measured as described below. First, the multilayer ceramic electronic component 100 is polished, and a cross section substantially perpendicular to the longitudinal direction L is exposed. The exposed cross section is observed with a microscope, and the thickness is measured. The measurement position is in a central portion in the lamination direction T.

The thickness of each of the nickel-plated layers and tin-plated layers is measured by using an X-ray fluorescence thickness gauge. In measuring the thickness of the nickel-plated layer, after the tin-plated layer is removed by using a stripping agent, such as ENSTRIP or Melstrip, and the nickel-plated layer is exposed, the measurement is performed.

Figure 6:
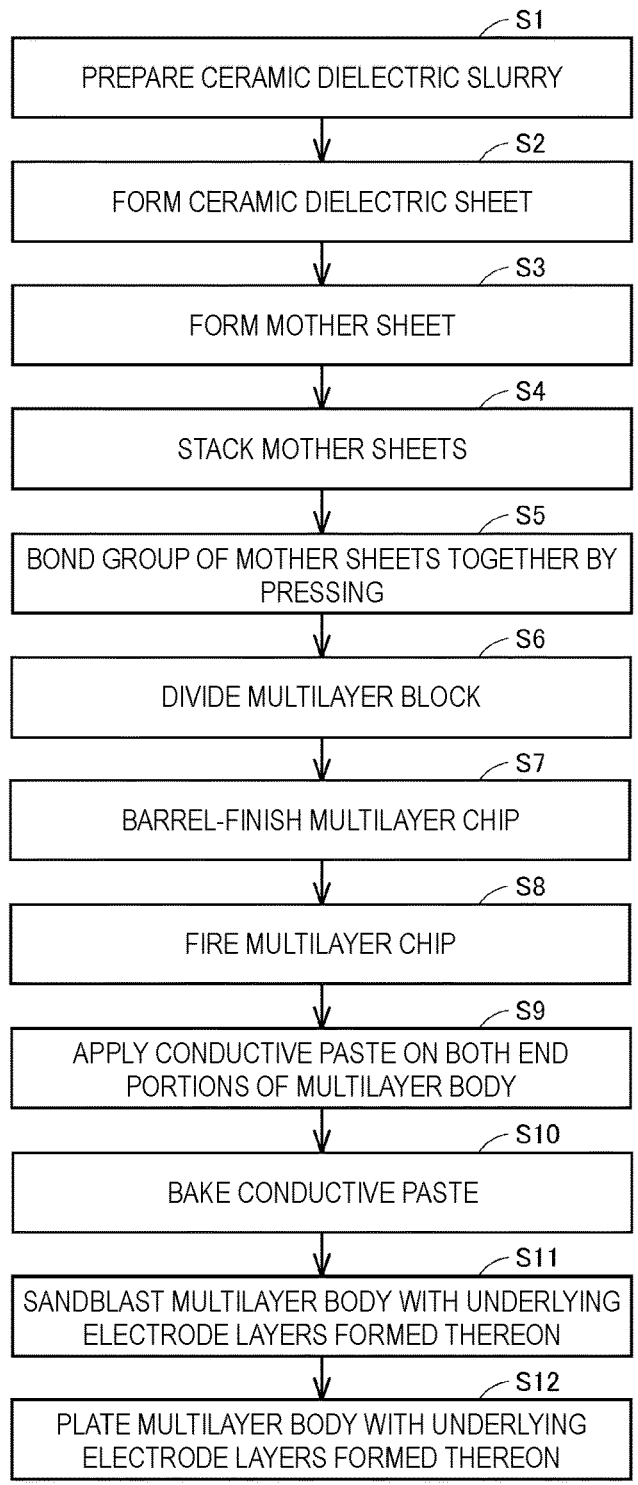
FIG. 6 is a flow chart that illustrates a method for manufacturing the multilayer ceramic electronic component according to a preferred embodiment of the present invention.

A non-limiting example of a method for manufacturing a multilayer ceramic electronic component 100 according to a preferred embodiment of the present invention is described below with reference to the FIG. 6. FIG. 6 is a flow chart that illustrates a non-limiting example of a method for manufacturing the multilayer ceramic electronic component according to a preferred embodiment of the present invention.

As illustrated in FIG. 6, in manufacturing the multilayer ceramic electronic component 100 according to the present preferred embodiment of the present invention, first, ceramic dielectric slurry is prepared (step S1). Specifically, ceramic dielectric powder, additive powder, binder resin, solvent, and the like are dispersed and mixed, and thus the ceramic dielectric slurry is prepared. The ceramic dielectric slurry may be based on a solvent or water. When the ceramic dielectric slurry is water-based paint, the ceramic dielectric slurry is prepared by mixing a water-soluble binder and dispersant or the like with a dielectric material.

Next, a ceramic dielectric sheet is formed (step S2). Specifically, the ceramic dielectric sheet is formed by forming the ceramic dielectric slurry into a sheet shape on a carrier film by using a die coater, gravure coater, micro-gravure coater, or the like and drying it. The ceramic dielectric sheet may preferably have a thickness of not more than about 3 μm, for example, to reduce the size and increase capacitance of the multilayer ceramic electronic component 100.

Next, a mother sheet is formed (step S3). Specifically, a mother sheet in which a predetermined inner electrode pattern is disposed on the ceramic dielectric sheet is formed by applying conductive paste on the ceramic dielectric sheet such that it has the predetermined pattern. Examples of the method for applying the conductive paste may include screen printing, inkjet printing, and gravure printing. The inner electrode pattern may preferably have a thickness of not more than about 1.5 μm, for example, to reduce the size and increase capacitance of the multilayer ceramic electronic component 100. In addition to the mother sheet having the inner electrode pattern, a ceramic dielectric sheet that does not undergo the above-described step S3 is also provided as another mother sheet.

Next, a plurality of mother sheets are stacked (step S4). Specifically, a predetermined number of mother sheets having no inner electrode patterns and made of only ceramic dielectric sheets are stacked. A predetermined number of mother sheets having inner electrode patterns are stacked thereon. Then, a predetermined number of mother sheets having no inner electrode patterns and made of only ceramic dielectric sheets are further stacked thereon. In that way, a group of mother sheets is formed.

Next, the group of mother sheets are bonded together by pressing, and a multilayer block is thus formed (step S5). Specifically, the multilayer block is formed by pressing and bonding the group of mother sheets together in the lamination direction with an isostatic press or rigid body press.

Next, the multilayer block is divided, and multilayer chips are formed (step S6). Specifically, the multilayer block is divided in a matrix shape by cutting by pressing down, by dicing, or by laser cutting, and is singulated into a plurality of multilayer chips.

Next, the multilayer chips are subjected to barrel-finishing (step S7). Specifically, the multilayer chips are placed into a small box called a barrel together with media balls having hardness higher than that of a dielectric material, the barrel is rotated, and thus the multilayer chips are polished. This process rounds the corner portions and ridge portions of the multilayer chips.

Next, the multilayer chips are fired (step S8). Specifically, each of the multilayer chips is heated, the dielectric material and conductive material included in the multilayer chip are thus fired, and the multilayer body 110 is formed. The firing temperature is set in accordance with the dielectric material and conductive material and may preferably be no less than about 900° C. and no more than about 1300° C., for example.

Next, conductive paste is applied on both end portions of the multilayer body 110 (step S9). The conductive paste is applied on both of the end portion including the first end surface 115 of the multilayer body 110 and the end portion including the second end surface 116.

Next, the conductive paste applied on both end portions of the multilayer body 110 is baked (step S10). This process forms a baked layer that corresponds to the first underlying electrode layer 121 and second underlying electrode layer 131. In the present preferred embodiment, the baking temperature is about 840° C., for example.

Next, the multilayer body 110 with the first underlying electrode layer 121 and second underlying electrode layer 131 formed thereon is subjected to sandblasting (step S11).

In the present preferred embodiment, zirconium oxide particles whose mean particle size is about 200 μm are used in the sandblasting, for example.

Next, the multilayer body 110 with the first underlying electrode layer 121 and second underlying electrode layer 131 formed thereon is subjected to plating (step S12). The underlying electrode layers are subjected to nickel plating and tin plating in this order, nickel-plated layer and tin-plated layer are formed, and thus the first outer electrode 120 and second outer electrode 130 are formed on the outer surface of the multilayer body 110.

The multilayer ceramic electronic component 100 can be manufactured through a series of the above-described steps.

Here, Example 1 is described. Example 1 verifies the relationship between the surface roughness (Sa) of each of the first nickel-plated layer 122 and second nickel-plated layer 132 and the mean particle size of zirconium oxide particles used in sandblasting.

In Example 1, the surface roughness (Sa) of the nickel-plated layer was measured for each of a multilayer ceramic electronic component in Preferred Embodiment 1 fabricated by the manufacturing method in the present preferred embodiment described above and multilayer ceramic electronic components in Comparative Examples 1 to 4 fabricated by a method that was different from the above-described manufacturing method of the present preferred embodiment in that only the mean particle size of zirconium oxide particles used in sandblasting was changed.

Specifically, the mean particle size of zirconium oxide particles in Preferred Embodiment 1 was about 200 μm, that in Comparative Example 1 was about 150 μm, that in Comparative Example 2 was about 100 μm, that in Comparative Example 3 was about 60 μm, that in Comparative Example 4 was about 0 μm. The multilayer ceramic electronic component in Comparative Example 4 was not sandblasted. The mean particle size of zirconium oxide particles is a mean value of particle sizes of 100 zirconium oxide particles measured by using an optical microscope.

A method for measuring the surface roughness (Sa) of the nickel-plated layer is described below. First, the tin-plated layer was removed by using a stripping agent, such as ENSTRIP or Melstrip, and the nickel-plated layer was exposed. After that, the surface roughness (Sa) of the nickel-plated layer positioned on the first end surface 115 or second end surface 116 was measured by using a laser microscope at a position in a central portion in the width direction W and a central portion in the lamination direction T in the range of about 50 μm (square) to about 100 μm (square), for example. The mean value of five measurements at different measurement positions within that range was defined as the surface roughness (Sa) of the nickel-plated layer.

Figure 7:
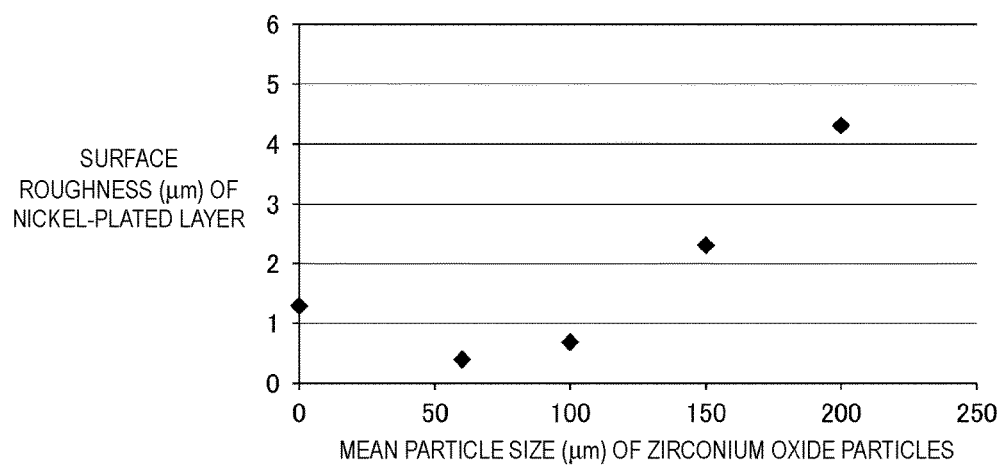
FIG. 7 is a graph that illustrates results of Example 1.

FIG. 7 is a graph that illustrates results of Example 1. In FIG. 7, the vertical axis indicates the surface roughness (μm) of the nickel-plated layer, and the horizontal axis indicates the mean particle size (μm) of zirconium oxide particles. As illustrated in FIG. 7, the surface roughness (Sa) of the nickel-plated layer tended to increase with an increase in the mean particle size of zirconium oxide particles, except for that in Comparative Example 4, in which no sandblasting was performed.

The surface roughness (Sa) of the nickel-plated layer in each of the multilayer ceramic electronic components in Comparative Examples 2 and 3, in which the mean value of zirconium oxide particles was not more than about 100 μm, was smaller than that in the multilayer ceramic electronic component in Comparative Example 4, in which no sandblasting was performed. The surface roughness (Sa) of the nickel-plated layer in each of the multilayer ceramic electronic components in Comparative Example 1 and Preferred Embodiment 1, in which the mean value of zirconium oxide particles was no less than about 150 μm, was larger than that in the multilayer ceramic electronic component in Comparative Example 4, in which no sandblasting was performed. The surface roughness (Sa) of the nickel-plated layer in the multilayer ceramic electronic component in Preferred Embodiment 1 was about 4.3 μm, which was no less than about 3 μm and no more than about 6 μm, for example.

The surface roughness (Sa) of the nickel-plated layer can be adjusted by omitting the sandblasting at step S11 and changing the baking temperature at step S10.

Here, Example 2 is described. Example 2 verifies the relationship between the surface roughness (Sa) of each of the first nickel-plated layer 122 and second nickel-plated layer 132 and the baking temperature in forming the baked layer.

In Example 2, the surface roughness (Sa) of the nickel-plated layer was measured for each of the multilayer ceramic electronic components in Comparative Examples 5 to 7 and Preferred Embodiments 2 and 3 fabricated by a method that was different from the above-described manufacturing method of the present preferred embodiment in that no sandblasting was performed and only the baking temperature in forming the baked layer was changed. The method for measuring the surface roughness (Sa) of the nickel-plated layer was the same as that in Example 1.

Specifically, the baking temperature in forming the baked layer in Preferred Embodiment 2 was about 790° C., that in Preferred Embodiment 3 was about 810° C., for example, and that in Comparative Example 5 was about 830° C., that in Comparative Example 6 was about 850° C., that in Comparative Example 7 was about 870° C. The range at or below about 780° C. is inappropriate because it is difficult to form the baked layer in a sufficiently minute manner.

Figure 8:
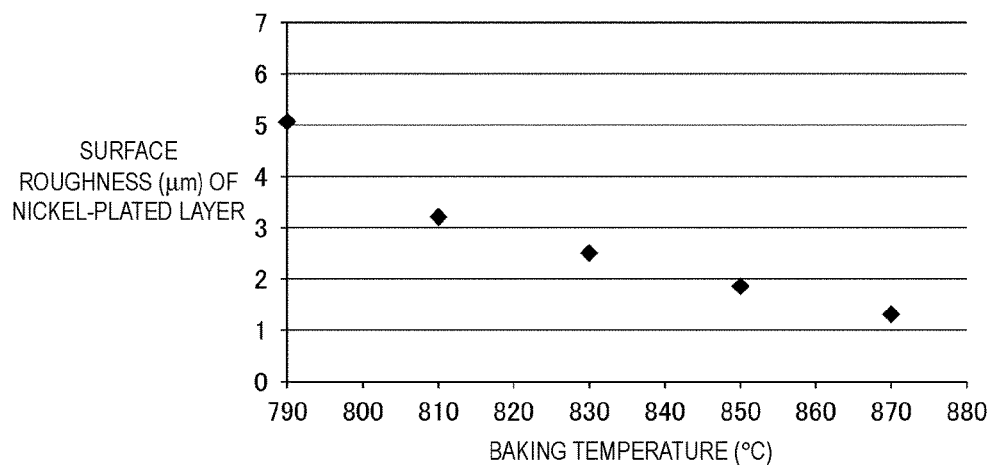
FIG. 8 is a graph that illustrates results of Example 2.

FIG. 8 is a graph that illustrates results of Example 2. In FIG. 8, the vertical axis indicates the surface roughness (μm) of the nickel-plated layer, and the horizontal axis indicates the baking temperature (° C.). As illustrated in FIG. 8, the surface roughness (Sa) of the nickel-plated layer tended to increase with a reduction in the baking temperature.

The surface roughness (Sa) of the nickel-plated layer in the multilayer ceramic electronic component in each of Preferred Embodiments 2 and 3, in which the baking temperature was not more than about 810° C., was no less than about 3 μm and no more than about 6 μm, for example. The surface roughness (Sa) of the nickel-plated layer of the multilayer ceramic electronic component in each of Comparative Examples 5 to 7, in which the baking temperature was no less than about 830° C., was below about 3 μm.

Here, Example 3 is described. Example 3 verifies the relation between the surface roughness (Sa) of each of the first nickel-plated layer 122 and second nickel-plated layer 132 and the self-alignment effect in mounting the multilayer ceramic electronic component.

In Example 3, the self-alignment effect appearing in mounting the multilayer ceramic electronic component for each of the multilayer ceramic electronic components in Preferred Embodiments 4 to 7, in which the surface roughness (Sa) of the nickel-plated layer was no less than about 3 μm and no more than about 6 μm, for example, in Comparative Examples 8 to 10, in which the surface roughness (Sa) of the nickel-plated layer was below 3 μm, and in Comparative Example 11, in which the surface roughness (Sa) of the nickel-plated layer was above 6 μm, was observed.

Figure 9:
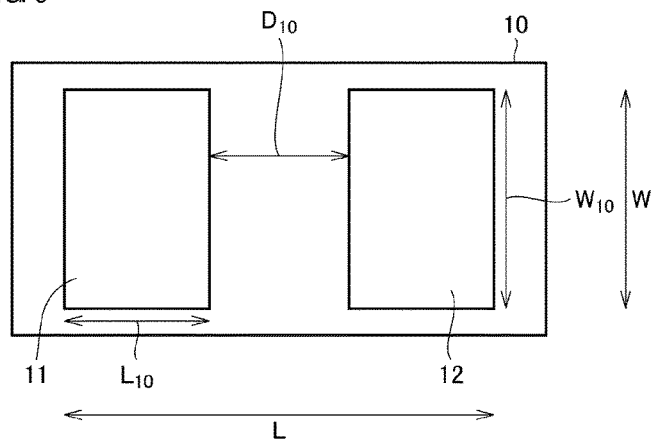
FIG. 9 is a plan view that illustrates a configuration of a substrate used in Example 3.
Figure 10:
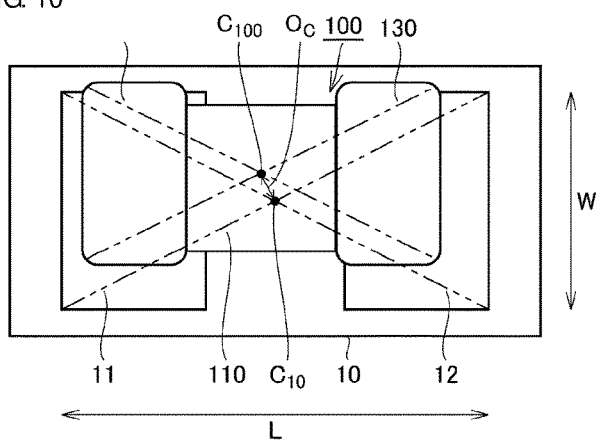
FIG. 10 is a plan view that illustrates a state in which the multilayer ceramic electronic component is mounted on the substrate in Example 3.

FIG. 9 is a plan view that illustrates a configuration of a substrate used in Example 3. FIG. 10 is a plan view that illustrates a state in which the multilayer ceramic electronic component is mounted on the substrate in Example 3. In FIGS. 9 and 10, the longitudinal direction L and width direction W of the multilayer body in the multilayer ceramic electronic component mounted on a substrate 10 are illustrated.

As illustrated in FIG. 9, a first land 11 and a second land 12 are disposed on a principal surface of the substrate 10 used in Example 3 such that they are spaced in the longitudinal direction L. As seen from the direction perpendicular or substantially perpendicular to the principal surface of the substrate 10, each of the first land 11 and second land 12 has a rectangular or substantially rectangular shape. The dimension of each of the first land 11 and second land 12 in the longitudinal direction L is $L_{10}$, and the dimension thereof in the width direction W is $W_{10}$. The distance between the first land 11 and second land 12 in the longitudinal direction L is $D_{10}$. The relationships that $L_{10}=0.10\pm0.03$ (mm), $W_{10}=0.14\pm0.03$ (mm), and $D_{10}=0.10\pm0.03$ (mm) are satisfied, for example.

The dimension in the longitudinal direction L for each of the multilayer ceramic electronic components in Preferred Embodiments 4 to 7 and Comparative Examples 8 to 11 is about 0.250±0.013 (mm), the dimension thereof in the width direction W is about 0.125±0.013 (mm), and the dimension thereof in the lamination direction T is about 0.125±0.013 (mm), for example.

Solder paste made of lead-free solder ($Sn_3Ag_{0.5}Cu$) was applied on each of the first land 11 and second land 12. The first outer electrode 120 was arranged on the first land 11, and the second outer electrode 130 was provided on the second land 12.

More specifically, as seen from the direction perpendicular or substantially perpendicular to the principal surface of the substrate 10, the first outer electrode 120 was arranged such that the center of the first outer electrode 120 was displaced to one side in the width direction W by about ½ of the dimension of the first outer electrode 120 in the width direction W with respect to the center of the first land 11. As seen from the direction perpendicular or substantially perpendicular to the principal surface of the substrate 10, the second outer electrode 130 was arranged such that the center of the second outer electrode 130 was displaced to one side in the width direction W by about ½ of the dimension of the second outer electrode 130 in the width direction W with respect to the center of the second land 12.

After that, the multilayer ceramic electronic component 100 arranged on the substrate 10 was heated and subjected to reflowing. After the reflowing, as seen from the direction perpendicular or substantially perpendicular to the principal surface of the substrate 10, a center-to-center distance Oc between a center C10 between the first land 11 and second land 12 and a center C100 of the multilayer ceramic electronic component was measured. The center C10 is the intersection point of a first imaginary straight line and a second imaginary straight line.

The first imaginary straight line connects a corner portion on a first side in the longitudinal direction L and a first side in the width direction W in the first land 11 and a corner portion on a second side in the longitudinal direction L and a second side in the width direction W in the second land 12, as seen from the direction perpendicular or substantially perpendicular to the principal surface of the substrate 10. The second imaginary straight line connects a corner portion on the first side in the longitudinal direction L and the second side in the width direction W in the first land 11 and a corner portion on the second side in the longitudinal direction L and the first side in the width direction W in the second land 12, as seen from the direction perpendicular or substantially perpendicular to the principal surface of the substrate 10.

The center C100 is the intersection point of a third straight imaginary line and a fourth imaginary straight line. The third imaginary straight line connects a corner portion on a first side in the longitudinal direction L and a first side in the width direction W in the first outer electrode 120 and a corner portion on a second side in the longitudinal direction L and a second side in the width direction W in the second outer electrode 130, as seen from the direction perpendicular or substantially perpendicular to the principal surface of the substrate 10. The fourth imaginary straight line connects a corner portion on the first side in the longitudinal direction L and the second side in the width direction W in the first outer electrode 120 and a corner portion on the second side in the longitudinal direction L and the first side in the width direction W in the second outer electrode 130, as seen from the direction perpendicular or substantially perpendicular to the principal surface of the substrate 10. When the corner portion is rounded, the sides defining the corner portion are extended and an intersection point of them is assumed as the corner portion.

Figure 11:
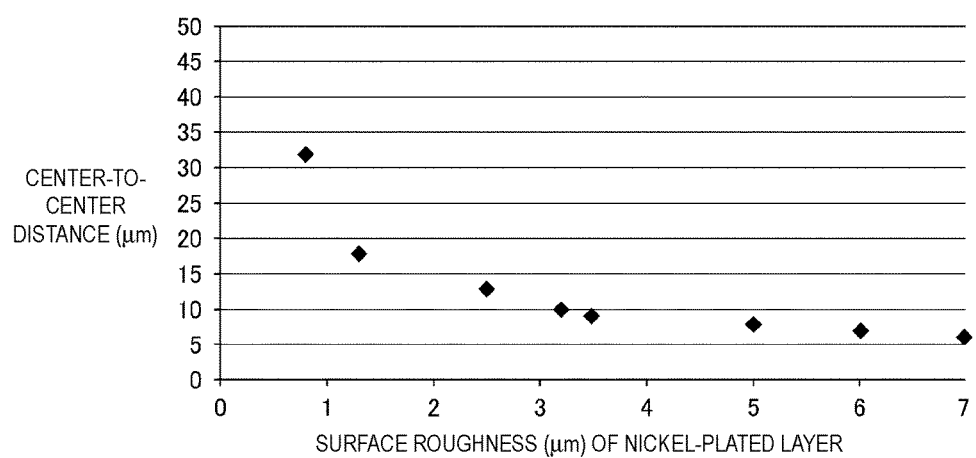
FIG. 11 is a graph that illustrates results of Example 3.

FIG. 11 is a graph that illustrates results of Example 3. In FIG. 11, the vertical axis indicates the center-to-center distance Oc (μm), and the horizontal axis indicates the surface roughness (μm) of the nickel-plated layer. The center-to-center distance Oc was measured by using a microscope. The center-to-center distance Oc illustrated in FIG. 11 is a mean value of the center-to-center distances Oc measured when 200 multilayer ceramic electronic components in each of Preferred Embodiments 4 to 7 and Comparative Examples 8 to 11 were fabricated and each of them was mounted on the substrate 10.

As illustrated in FIG. 11, the center-to-center distance Oc tended to reduce with an increase in the surface roughness (Sa) of the nickel-plated layer. As the center-to-center distance Oc reduces, the self-alignment effect in mounting the multilayer ceramic electronic component increases. Accordingly, as the surface roughness (Sa) of the nickel-plated layer increased, the self-alignment effect in mounting the multilayer ceramic electronic component increased.

This phenomenon may occur from a mechanism described below. An increase in the surface roughness (Sa) of the nickel-plated layer results in an increase in the surface area of the nickel-plated layer. This increase leads to an increase in the area where the nickel-plated layer and solder are joined. Thus, the solder is solidified and shrunk during reflowing, the tensile load exerted on the multilayer ceramic electronic component is increased, and the self-alignment effect is enhanced.

In Preferred Embodiments 4 to 7, in which the surface roughness (Sa) of the nickel-plated layer in the multilayer ceramic electronic component was no less than about 3 μm and no more than about 6 μm, the center-to-center distance Oc was not more than 10 μm, for example, and the arrangement accuracy in mounting the multilayer ceramic electronic component was improved by effective use of the self-alignment effect. In Comparative Example 11, in which the surface roughness (Sa) of the nickel-plated layer in the multilayer ceramic electronic component was above about 6 μm, the center-to-center distance Oc was not more than about 10 μm, but the multilayer ceramic electronic component was mounted in a state where the end surface of the multilayer body was inclined to the substrate 10 as seen from the longitudinal direction L of the multilayer body.

Example 3 reveals that the multilayer ceramic electronic component 100 according to the present preferred embodiment achieves improved arrangement accuracy in mounting the multilayer ceramic electronic component 100 by effective use of the self-alignment effect. Accordingly, the multilayer ceramic electronic components according to the present preferred embodiments are able to be densely mounted on the substrate.

In the above description of the preferred embodiments, any configurations that can be combined may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a plurality of dielectric layers and a plurality of inner electrode layers being laminated and including a first principal surface and a second principal surface opposed to each other in a lamination direction, a first side surface and a second side surface opposed to each other in a width direction perpendicular or substantially perpendicular to the lamination direction, and a first end surface and a second end surface opposed to each other in a longitudinal direction perpendicular or substantially perpendicular to both the lamination direction and the width direction;
   a first outer electrode disposed on the first end surface and disposed on and connecting a portion of each of the first principal surface, the second principal surface, the first side surface, and the second side surface; and
   a second outer electrode disposed on the second end surface and disposed on and connecting a portion of each of the first principal surface, the second principal surface, the first side surface, and the second side surface; wherein
   a dimension of the multilayer ceramic electronic component in the longitudinal direction is no less than about 0.12 mm and no more than about 0.27 mm;
   a dimension of the multilayer ceramic electronic component in the width direction is no less than about 0.06 mm and no more than about 0.14 mm; and
   a dimension of the multilayer ceramic electronic component in the lamination direction is no less than about 0.06 mm and no more than about 0.14 mm;
   each of the first outer electrode and the second outer electrode includes an underlying electrode layer disposed on the surface of the multilayer body, a nickel-plated layer covering the underlying electrode layer, and a tin-plated layer covering the nickel-plated layer; and
   the nickel-plated layer in each of the first outer electrode and the second outer electrode has a surface roughness of no less than about 3 μm and no more than about 6 μm.

2. The multilayer ceramic electronic component according to claim 1, wherein the underlying electrode layer has a maximum thickness of no less than about 5 μm and no more than about 20 μm.

3. The multilayer ceramic electronic component according to claim 1, wherein the nickel-plated layer has a thickness of no less than about 1 μm and no more than about 6 μm.

4. The multilayer ceramic electronic component according to claim 1, wherein the multilayer ceramic electronic component is one of a capacitor, an inductor, and a thermistor.

5. The multilayer ceramic electronic component according to claim 1, wherein the multilayer body has a rectangular or substantially rectangular shape.

6. The multilayer ceramic electronic component according to claim 1, wherein the multilayer body includes a rounded corner portion and a rounded ridge portion.

7. The multilayer ceramic electronic component according to claim 1, wherein a number of the plurality of dielectric layers is no less than 20 and no more than 100.

8. The multilayer ceramic electronic component according to claim 1, wherein each of a pair of outer layers of the plurality of dielectric layers has a thickness of no less than about 10 μm and no more than about 30 μm.

9. The multilayer ceramic electronic component according to claim 1, wherein each of the plurality of dielectric layers included in an inner layer portion of the multilayer body has a thickness of no less than about 0.5 μm and no more than about 3 μm.

10. The multilayer ceramic electronic component according to claim 1, wherein a number of the plurality of inner electrode layers is no less than 10 and no more than 60.

11. The multilayer ceramic electronic component according to claim 1, wherein the underlying electrode layer of each of the first outer electrode and the second outer electrode includes at least one of a baked layer, a resin layer and a thin film layer.

12. The multilayer ceramic electronic component according to claim 11, wherein the baked layer includes glass and metal.

13. The multilayer ceramic electronic component according to claim 11, wherein the baked layer includes a plurality of layers.

14. The multilayer ceramic electronic component according to claim 11, wherein a thickness of the baked layer has a maximum thickness of no less than about 5 μm and no more than about 20 μm.

15. The multilayer ceramic electronic component according to claim 11, wherein the resin layer includes conductive particles and thermosetting resin.

16. The multilayer ceramic electronic component according to claim 11, wherein the resin layer includes a plurality of layers.

17. The multilayer ceramic electronic component according to claim 11, wherein a thickness of the resin layer has a maximum thickness of no less than about 5 μm and no more than about 20 μm.

18. The multilayer ceramic electronic component according to claim 11, wherein the thin film layer is a sputtered or vapor deposited layer including metal particles.

19. The multilayer ceramic electronic component according to claim 11, wherein a thickness of the thin film layer is not more than about 1 μm.

20. The multilayer ceramic electronic component according to claim 1, wherein each of the plurality of inner electrode layers has a thickness of no less than about 0.3 μm and no more than about 1.0 μm.

* * * * *